(12) United States Patent
Black et al.

(10) Patent No.: US 7,617,315 B2
(45) Date of Patent: Nov. 10, 2009

(54) MULTI-LAYERED MEASUREMENT MODEL FOR DATA COLLECTION AND METHOD FOR DATA COLLECTION USING SAME

(76) Inventors: Chuck A. Black, 3537 Broadstone Ct., Rocklin, CA (US) 95765; John M. Green, 5910 Willowynd Dr., Rocklin, CA (US) 95677

( * ) Notice: Subject to any disclaimer, the term of this patent is extended or adjusted under 35 U.S.C. 154(b) by 863 days.

(21) Appl. No.: 11/213,726

(22) Filed: Aug. 30, 2005

(65) Prior Publication Data

US 2006/0059258 A1 Mar. 16, 2006

Related U.S. Application Data

(60) Provisional application No. 60/605,552, filed on Aug. 31, 2004.

(51) Int. Cl.
*G06F 15/173* (2006.01)
(52) U.S. Cl. .................. 709/224; 709/223; 709/225; 709/219; 709/227; 709/217; 709/226; 709/235; 370/400; 370/392; 370/338

(58) Field of Classification Search ......... 709/223–227, 709/217, 219, 235, 226
See application file for complete search history.

(56) References Cited

U.S. PATENT DOCUMENTS 6,609,083 B2 * 8/2003 Enck et al. .................. 702/186

* cited by examiner

*Primary Examiner*—Jude J Jean Gilles

(57) ABSTRACT

A method and system are described for collecting information from a device in a network at a collection interval. According to an exemplary embodiment, a method for collecting the information includes determining data needed from the device at the collection interval to evaluate the information. A measurement request is defined for collecting the data from the device at the collection interval. The measurement request is merged with other measurement requests for collecting the data from the device at the collection interval into a single merged measurement request at the collection interval. The measurement request is also merged with other measurement requests for collecting the data from the device at different collection intervals having a common integral divisor into a single merged measurement request at a highest of the different collection intervals.

14 Claims, 9 Drawing Sheets

MULTI-LAYERED MEASUREMENT MODEL FOR DATA COLLECTION AND METHOD FOR DATA COLLECTION USING SAME

RELATED APPLICATIONS

The present non-provisional application claims priority under 35 U.S.C. §119(e) of Provisional Application Ser. No. 60/605,552, entitled: MULTI-LAYERED MEASUREMENT MODEL FOR DATA COLLECTION AND METHOD FOR DATA COLLECTION USING SAME, filed Aug. 31, 2004, Chuck A. Black and John M. Green, the disclosure of which is hereby incorporated by reference in its entirety.

BACKGROUND

Network management products, such as Hewlett Packard's Network Node Manager (HP's NNM), can provide for performance management of a network by monitoring the performance of network hardware, software, and media, such as throughput rate, percentage utilization, error rates, and response time, through the collection and analysis of data about the network. Data collection can occur either by sending measurement requests to devices operating in the network from a central management station that collects and processes the information, or can occur on a distributed basis by having several collection stations (or agents), operating within the network, that send requests for information to the various devices in the network. As the number of application programs and users of a network increases, the number of requesters of information about devices operating within the network increases as well.

The task of collecting data on behalf of multiple requestors can result in duplicity in the requests for information that can occur over the entire network. As a result, the same information can be requested and gathered, repetitively, from the same target device for each requestor of the information. Unless an intelligent mechanism is put in place to consolidate and condense these data requests, a targeted device in the network can become overloaded with unnecessary requests for data. For certain types of target devices, this situation may not be of considerable consequence. But for other critical resources in a network, such as routers or switches, the extra burden placed on the devices from a multitude of data requests can prove harmful to the performance of the device, and ultimately to the entire network. In addition, a large number of duplicate requests for information can result in unnecessary data processing and storage requirements being placed on the measurement system.

Prior solutions have required a coordination of the measurement requests on the part of the measurement requesters to limit the number of requests sent to a particular device. But such direct coordination among different requesters can be difficult to achieve, and can require the creation of a complex, coordinated, and rigid measurement definition that is not easily adapted to changes that can occur in the measurement environment.

SUMMARY

Accordingly, a method and system are described for collecting information from a device in a network at a collection interval. According to an exemplary embodiment, a method for collecting the information includes determining data needed from the device at the collection interval to evaluate the information. A measurement request is defined for collecting the data from the device at the collection interval. The measurement request is merged with other measurement requests for collecting the data from the device at the collection interval into a single merged measurement request at the collection interval. The measurement request is also merged with other measurement requests for collecting the data from the device at different collection intervals having a common integral divisor into a single merged measurement request at a highest of the different collection intervals.

According to another exemplary embodiment, a measurement model for collecting the information includes a collection layer having a collection object corresponding to the device and to the collection interval. The collection object includes a collection member configured to identify the information to be collected from the device at the collection interval, and a measurable member associated with the collection member. The measurable member is configured to store data needed from the device at the collection interval to evaluate the information. The measurement model also includes an instrumentation layer having an instrumentation object corresponding to the device. The instrumentation object includes an instrumentation member associated with collecting the data needed from the device at the collection interval to evaluate the information. The instrumentation member includes a reference to the measurable member configured to store the collected data.

According to yet another exemplary embodiment, a system for collecting the information includes means for determining data needed from the device at the collection interval to evaluate the information. Means is included for merging measurement requests for collecting the data from the device at the collection interval into a single merged measurement request at the collection interval. Additional means in included for merging measurement requests for collecting the data from the device at different collection intervals having a common integral divisor into a single merged measurement request at a highest of the different collection intervals. The system also includes means for launching a measurement request having a collection interval that is a highest integer multiple of a current measurement interval.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Figure 1:
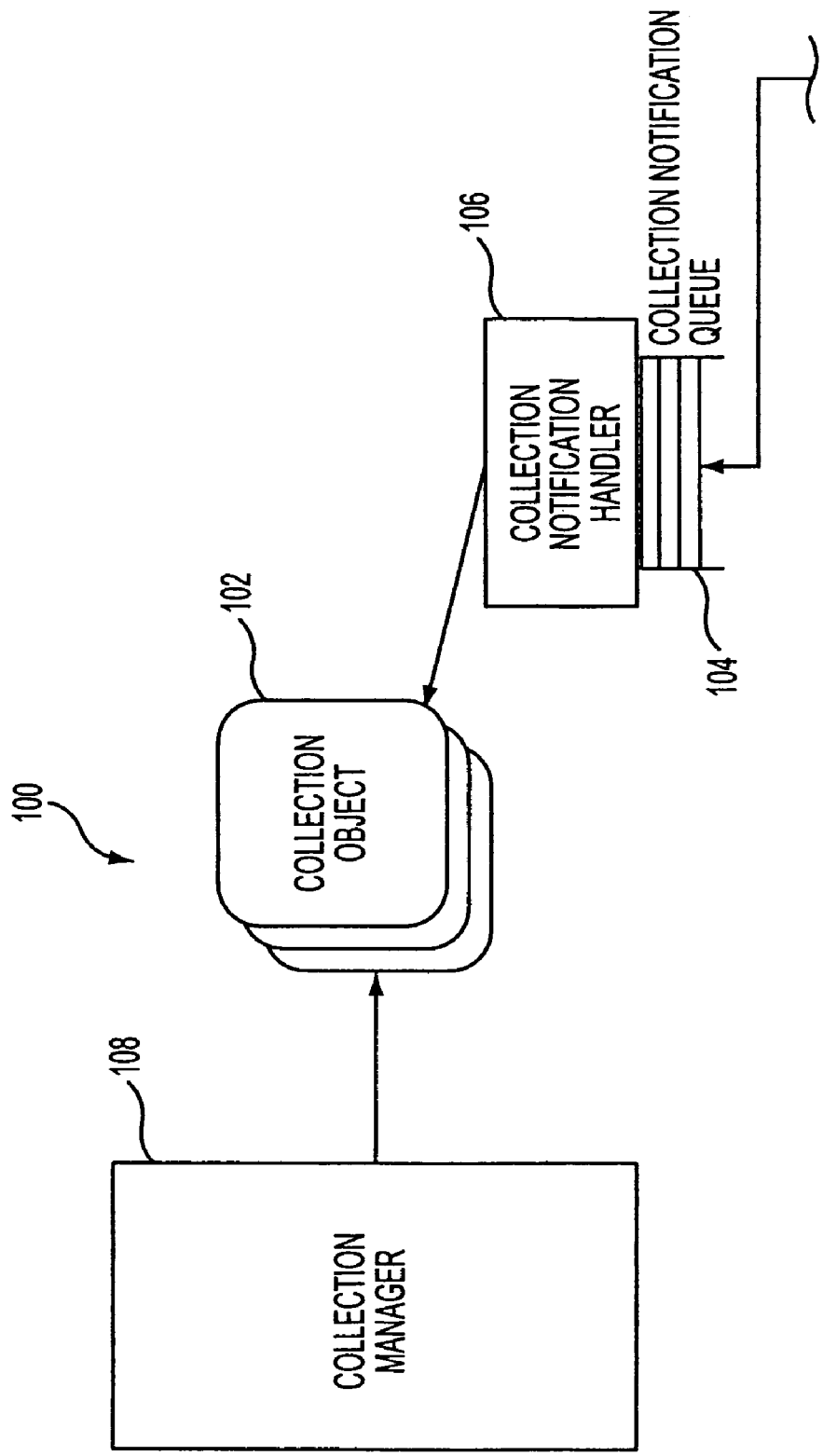
FIG. 1 illustrates exemplary objects of a collection layer portion of a measurement model for collecting information from a device in a network at a collection interval.

Various aspects will now be described in connection with exemplary embodiments, including certain aspects described in terms of sequences of actions that can be performed by elements of a computer system. For example, it will be recognized that in each of the embodiments, the various actions can be performed by specialized circuits or circuitry (e.g., discrete and/or integrated logic gates interconnected to perform a specialized function), by program instructions being executed by one or more processors, or by a combination of both.

According to a first embodiment, a measurement model is described that is capable of capturing the nature of a data collection or measurement environment in an abstract manner. The exemplary measurement model and its implementation in the measurement environment allows for the use of relatively simple, but intelligent objects, that can optimize the consolidation of measurement requests with the measurement environment.

As used here, the phrase "measurement model", or more simply the term "model", is used to describe a data model that can be used define the information contained in a database, such as the data store of a collection or management station operating in a managed network environment. The measurement model can also define how the information in the database can be used and how the database items can be related to one another. A data model that captures object-oriented programming concepts can be referred to as an object model. An object model can include a number of objects used by various application programs to perform object-related tasks. In this context, an object can be a software bundle of variables (e.g., attributes and data) and related methods. The methods can be carried out using software programs, code, or executable program instructions associated with the object. Because the measurement model described here can be used to collect data from devices operating in a network, the measurement model can also be referred to as a "collector".

The exemplary measurement model includes a three-tiered data structure for defining, storing, and collecting measurement data. The basic building blocks of each tier of the structure include, respectively: collection members, measurement members, and instrumentation members. The terms "collection", "measurement", and "instrumentation" used to describe the different members are merely illustrative, and should not be interpreted in any way as limiting in scope. In the exemplary embodiment, collection members can be used define a basic structure in which users conceptually view data collection, e.g., using tables with rows and columns. The measurement members can make up portions of each collection member, and can be combined to represent expressions, counters, gauges, and basic numeric and text values, each of which will be described in greater detail below. Finally, the instrumentation members can represent the actual data that is collected from a measurable object, e.g., a port or interface on a router or switch, in the data's most basic form.

In addition to the three-tiered data structure briefly described above, the exemplary measurement model can be partitioned-into two functional layers referred to here as the collection layer and instrumentation layer. Again, the terms "collection" and "instrumentation" used to describe the layers is merely illustrative, and should not be interpreted as limiting in any way. The collection layer includes a group of objects (methods and data) configured to control and manage the collection of data within the measurement environment. The instrumentation layer includes another group objects configured to manage and control the consolidation and optimization of measurements occurring within the measurement environment. As such, the collection layer can be considered to be more of a physical layer of the measurement model, whereas the instrumentation layer can be considered as more of a logical layer in model, but this characterization is merely illustrative. By optimizing measurement requests at the more abstract instrumentation layer, the measurable objects, e.g., the switches and routers, in a network can being queried for an item of data by multiple measurement sources, but need only receive a single request for the item of data via the measurement model.

FIG. 1 depicts the exemplary objects of a collection layer 100. The collection layer 100 includes a collection object 102 corresponding to a device (not shown) and to a collection interval. The phrase "collection interval" as used here refers to an interval of time (e.g., 1, 5, and 15 minutes) at which a measurement (or collection) of data form the device is to take place. Collection intervals are typically periodic within a fixed measurement window (typically defined as one hour). Thus, a measurement having a collection interval of 15 minutes within a fixed one hour measurement window would measure (or collect) data from the device four times an hour.

Figure 2:
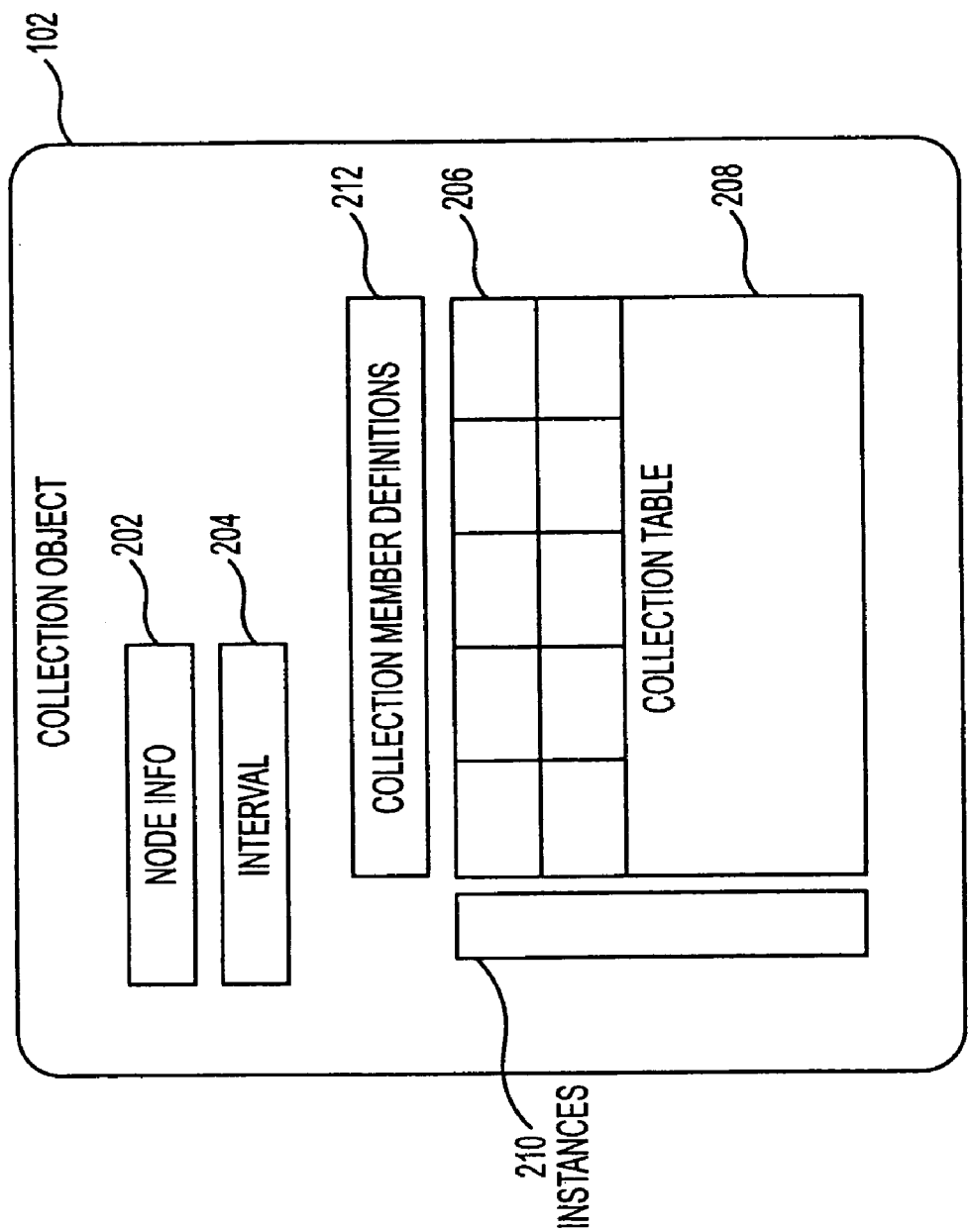
FIG. 2 illustrates an exemplary arrangement of a collection object included in the collection layer portion of FIG. 1.

FIG. 2 illustrates an exemplary arrangement of a collection object 102 included in the collection layer 100 shown in FIG. 1. Collection objects are objects in the measurement model capable of storing information about a specific collection (or measurement) for a specific node. Each collection object 102 included in the measurement model corresponds to a particular device (not shown) and a particular collection interval that data is to be collected from the device. For example, if a collection is defined to gather interface data from ten nodes in the network, then the measurement model will include ten collection objects to define the collections. A collection object 102 includes information about the device (or node) 202 and the collection interval 204 that the object 102 represents in the measurement model.

The collection object 102 includes a collection member 206 configured to identify information to be collected from the device at the collection interval 204. A collection object 102 can include several collection members 206. As discussed above, the collection member 206 can represent the tier of the three-tiered data structure for defining a measurement (or collection). The collection member 206 can represent a single, simple value which has been retrieved from a target node or device, or can be a complex expression evaluated from a number of individual data items gathered from the target node.

The collection object 102 can also include a collection table 208 as shown in FIG. 2. Each cell of the collection table 208 can correspond to a particular collection member 206. The collection table 208 can include at least one row corresponding to a respective instance (or interface) 210 of the device associated with the information to be collected from the device at the collection interval. For example, certain network devices, such as routers and switches, can have multiple interfaces 210 (or ports) through which information is exchanged. As such, a row in the table 208 can represent the various collections defined for one of the device's interfaces 210.

The table 208 can also include at least one column corresponding to a respective definition of the information to be collected from the device at the collection interval. Preferably, a collection object 102 includes a single collection table 208 defining the data to be collected from the corresponding device. The definitions of the data being collected can be included in the table as member definitions 210. Each member definition 212 can be associated with the column in the table 208 that it represents.

Figure 3:
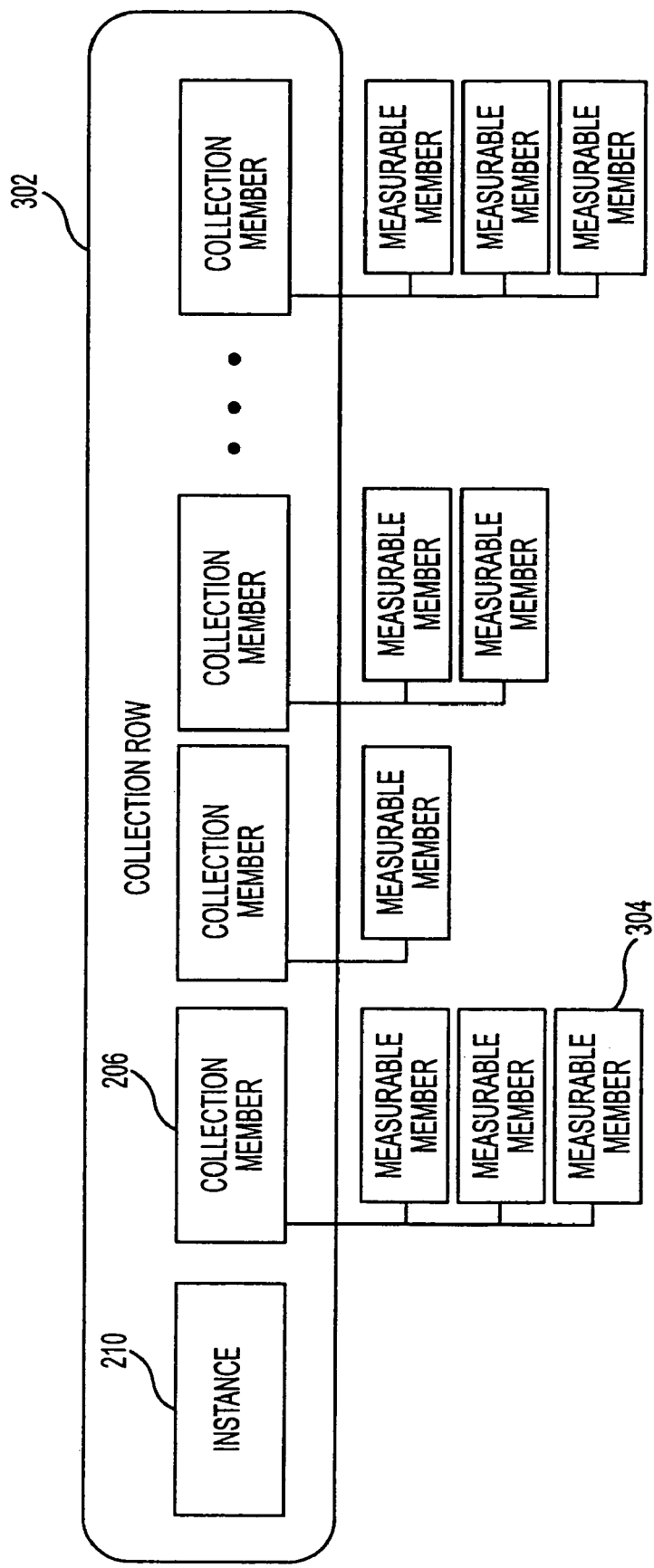
FIG. 3 illustrates an exemplary arrangement of a collection row of the collection object of FIG. 2.

The collection object 102 also includes a measurable member associated with the collection member. The measurable member is configured to store data needed from the device at the collection interval to evaluate the information, and consequently can represent the tier of the three-tiered data structure for storing a measurement (or collection). FIG. 3 illustrates an exemplary arrangement of a collection row of the collection table 206 shown in FIG. 2. The collection row 302 shown includes a number of collection members 206 that define various collections for a particular instance (or interface) 210 of the device. As shown in the figure, a collection member 206 can be associated with one or more measurable members 304. A measurable member 304 can represent an individual data item gathered from the device. The measurable member 204 can be a simple string, or it can be a numeric value such as a gauge, counter, or ratio (discussed below), and can be used to evaluate the information defined in collection member 206 to which they belong.

Referring back to FIG. 1, the collection layer 100 can also include a notification queue 104 configured to receive a message from the instrumentation layer (discussed in detail below in connection with FIGS. 4-6) indicating that the data needed from the device or instance 210 at the collection interval 204 to evaluate the information identified in the collection member 206 is stored in the associated measurable member 304. The notification queue 104 can be a thread-safe queue for passing messages between threads. A thread-safe queue is a mechanism for safely passing arrays of data between separate program threads, e.g., between a thread associating with collecting the data and a thread for evaluating the information based on the collected data. With such an arrangement, messages can be placed into the queue whenever data has been received for a particular collection object. The collection object can then process the received data and pass the resulting collected information on to destinations interested in the information.

The collection layer 100 can further include a notification handler 106, coupled to the notification queue 104, and configured to evaluate the information identified in the collection member 206 using the data stored in the associated measurable member 304 when a message is received in the notification queue 104 indicating that the needed data is stored in an associated measurable member 304. The notification handler 106 can thus be considered a thread that waits for messages to arrive at the notification queue 104. These messages arrive indicating that the data for a specific collection object 102 has arrived, and is ready to be processed. When the data arrives, the collection object 102 is processed by the notification handler 106, and the resultant output is passed on to interested destinations.

The collection layer 100 can also include means for determining data needed from the device at the collection interval to evaluate the information, such as a collection manager. The collection manager 108 can be configured to build one collection object 102 per respective device and associated collection interval 204 included in a collection definition. Collection objects can be created by invoking a method (e.g., a createCollection method) of the collection manager 108. The createCollection method of the collection manager 108 can take as its input the collection definition (collectionDefn), which can include a set of target devices and the corresponding intervals at which the collection are to be run. The collection definition can also include expressions, represented by strings having a particular syntax, that can describe the arithmetic or logical operations that are to be performed on the set of measurable members to the information to be collected.

The collection manager 108 can also be responsible for the startup and shutdown of the collector or measurement model. It can add and remove data collections from the model. The collection manager 108 can also build or initiate the building of the infrastructure of the collector, e.g., collection objects 102, and the like. The collection manager 108 also communicates with an instrumentation manager (discussed in greater detail below) regarding the startup and shutdown of the model's instrumentation layer.

Figure 4:
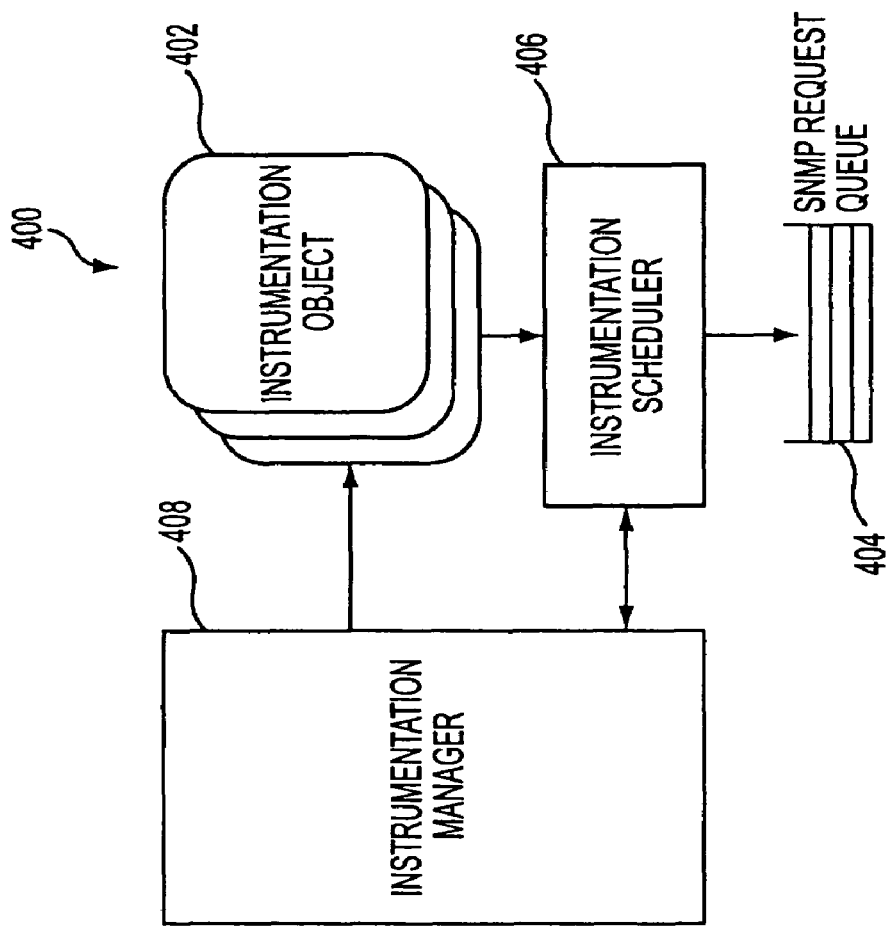
FIG. 4 illustrates exemplary objects of an instrumentation layer portion of the measurement model.

As discussed above, whereas the collection layer 100 can be considered to be more of a physical layer of the measurement model, the instrumentation layer can be viewed as more of a logical layer in model. FIG. 4 illustrates exemplary objects of an instrumentation layer 400 portion of the measurement model according to an exemplary embodiment. The instrumentation layer 400 includes an instrumentation object 402 that corresponds to the device. Instrumentation objects can be created to manage the gathering of data from target nodes. Preferably, one instrumentation object 402 exists per device from which data will be collected, but other implementations are possible.

Figure 5:
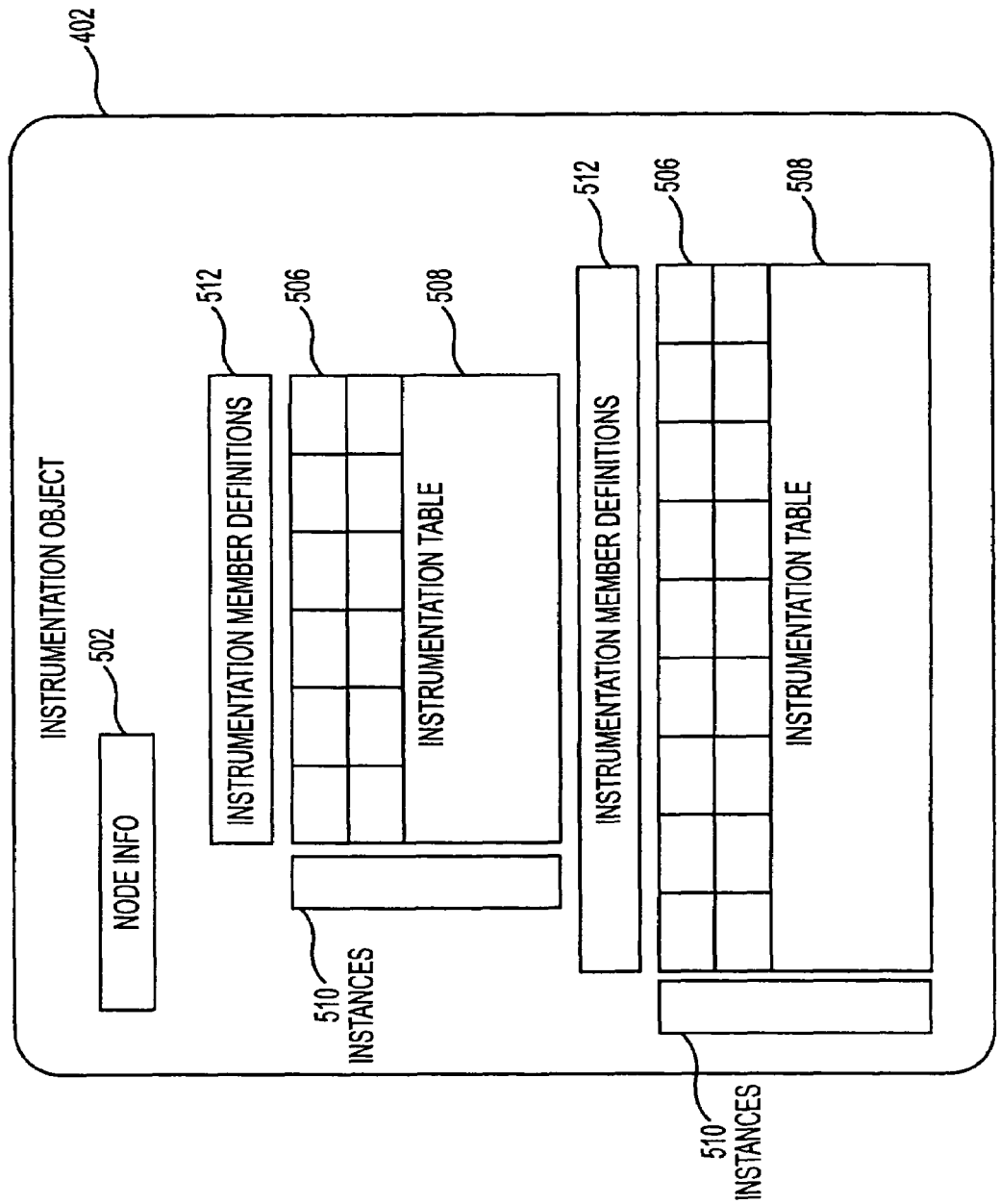
FIG. 5 illustrates an exemplary arrangement of an instrumentation object included in the instrumentation layer portion of FIG. 4.

FIG. 5 illustrates an exemplary arrangement of the instrumentation object 402 included in the instrumentation layer 404 portion of FIG. 4. The instrumentation object 402 can include information about the device (or node) 502 that the object 402 represents in the measurement model. The instrumentation object 402 includes an instrumentation member 506 associated with collecting the data needed from the device at the collection interval 204 to evaluate the information being collected. The instrumentation member 506 can represent the tier of the three-tiered data structure for collecting a measurement (or collection).

Figure 6:
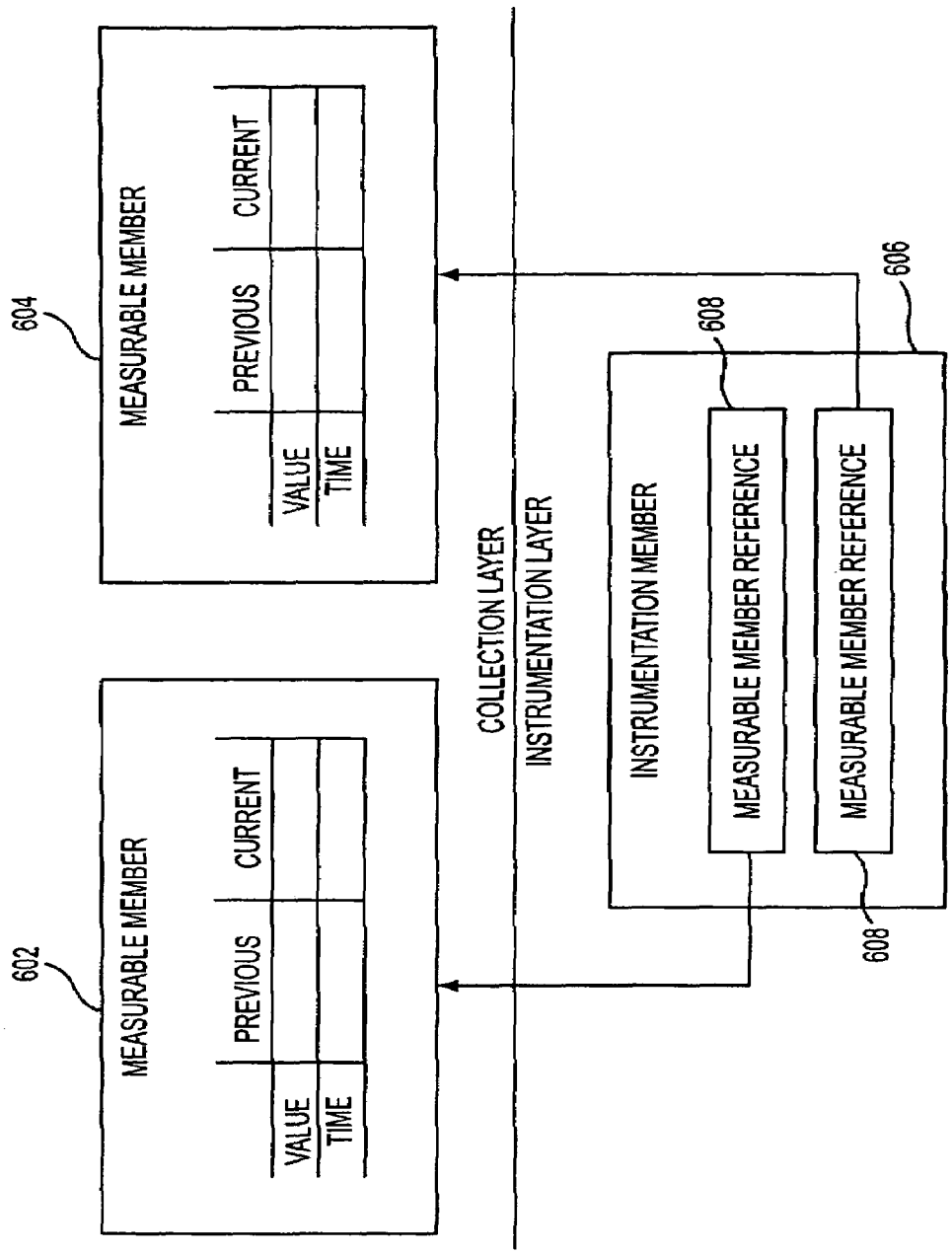
FIG. 6 illustrates an exemplary relationship between measurable members of the collection layer portion of the measurement model and instrumentation members of the instrumentation layer portion of the model.

The instrumentation member 506 includes a reference to the measurable member 304 that is configured to store the collected data. The reference provides a link between the single instrumentation member 506, which is the actual raw value gathered from the target device, and the measurable member 304 interested in the item of data. The instrumentation member 506 can include references to several measurable members 304 that are interested in the data. For example, FIG. 6 shows a instrumentation member 606 having references 608 (or links) to each of a first measurable member 602 and a second measurable member 604. When the data is collected by the instrumentation member 506, the data can be copied to all interested measurable members 602, 604 linked through references 608 included in the instrumentation member 506. In this way, if multiple destinations are interested in the data, the data can be gathered only once from the target device, and then passed along to all interested destination. This can reduce the burden placed on the target device that can result from multiple, simultaneous collections.

Like the collection object 102 shown in FIG. 2, the instrumentation object 402 can include an instrumentation table 508. The table 508 can include the specific items of data that are to be gathered from the target device. Each cell in the table 508 can correspond to an instrumentation member 506, which logically represents the actual data gathered from the target device. The instrumentation table can include at least one row corresponding to a respective interface 510 of the device associated with the data needed from the device at the collection interval 204 to evaluate the information. The interface (or instance) information 510 can be the same instance information 210 included in the corresponding collection object 102.

The table 508 can also include at least one column corresponding to a respective definition of the data needed from the device at the collection interval to evaluate the information. The table 508 can include a list of member definitions 512 that define the instrumentation members 506 included in the corresponding column in the table 508. There can be one or more instrumentation tables 508 (two are shown in the figure) included within each instrumentation object 402. The tables 508 can be arranged so as to optimize the accessing of data from each target node. For example, if more than one table 508 is included in the instrumentation object 402, it can be advantageous to have each table correspond to various measurements defined at a respective collection interval 204. This can help to simply the task of interval list building, which will now be discussed.

According to an exemplary embodiment, the instrumentation layer 400 can include an interval map routine configured to group instrumentation members 506 of at least one instrumentation object 402 into a set of interval lists based on the collection intervals 204 associated with the instrumentation members. If the instrumentation tables 508 of the various instrumentation objects 402 defined in the measurement model are organized by the collection interval 204, the members 506 included in the tables 508 corresponding to a same collection interval 204 can be gathered into a corresponding interval list.

The measurement model can also include means for merging measurement requests for collecting the data from the device at the collection interval into a single merged measurement request at the collection interval. For example, the interval map routine can be configured to merge the instrumentation members 506 of a particular interval list associated with collecting a same data from a same device into a single merged instrumentation member. To merge the instrumentation members, the interval map routine can be configured to add references to measurable members 304 included in the respective instrumentation member 506 being merged into the single merged instrumentation member 506. The references provide links to each of the measurable members 304 of the instrumentation members 506 being merged together.

Additional means for merging measurement requests for collecting the data from the device at different collection intervals having a common integral divisor into a single merged measurement request at a highest of the different collection interval can also be included in the model. For example, the interval map routine can also be configured merge the instrumentation members of a particular interval list with the instrumentation members of the other interval lists associated with collecting a same data from a same device when the collection intervals of the instrumentation members of the other interval lists are an integral divisor of the collection interval of the instrumentation members of the particular interval list.

To illustrate, the instrumentation members 506 included in a 5 minute interval list can be merged with the instrumentation members included in a 15 minute interval list, 5 being an integral divisor of 15, because the measurements scheduled to occur every 5 minutes will also be scheduled to occur at the 15 minute interval. Merging the 5 and 15 minute interval lists can help to assure optimization of the data collection at the 15 minute interval. When the collection interval 204 of an interval list does not divide evenly into the collection interval 204 of another list, no merging of the lists is performed. For example, the instrumentation members 506 of a 10 minute interval list are not merged with the instrumentation members 506 of the 15 minute interval list, since 10 does not divide evenly into 15.

To merge the instrumentation members 506 of the interval lists having different collection intervals 204, the interval map routine can gather the instrumentation members 506 having a highest collection interval 204 (e.g., 15 minutes) into a first interval list. The interval map routine can then merge the instrumentation members 506 of a destination interval list (e.g., the 15 minute interval list) with the instrumentation members 506 included in a source interval list (e.g., the 5 minute interval list) as follows. When an instrumentation member 506 in the source interval list for collecting data from a target device is not present in the destination interval list, then the instrumentation member 506 is added to the destination interval list. When a corresponding instrumentation member 506 for collecting the same data from the same target device is present in the destination interval list, then the instrumentation member 506 of the source interval list is merged into the corresponding instrumentation member 506 of the destination list by adding references to the measurable members 304 included in the instrumentation member being merged into the corresponding merged instrumentation member.

The result will be that the instrumentation member 506 of the source interval list, e.g., the member 506 for the 5 minute interval, remains unchanged, while the corresponding instrumentation member 506 of the destination interval list, e.g., the member 506 for the 15 minute interval, has been augmented with the measurable member 304 references instrumentation member 506 merged from the 5 minute interval list. When the interval map routine has completed merging the instrumentation members 506 of the other interval lists into the highest interval list, the same merging operations can be performed on the interval list having the second highest collection interval 204, e.g., 10 minutes. When merging at the second highest interval list is complete, the routine can then merge instrumentation members 506 at the third highest collection interval 204, e.g., 5 minutes, and so on, until the instrumentation members 506 of all of the interval lists have been merged together.

According to an exemplary embodiment, the measurement model can include means for launching a measurement request having a collection interval that is a highest integer multiple of a current measurement interval. For example, the instrumentation layer can also include an instrumentation scheduler configured to schedule the collecting of information from the network at periodic measurement intervals. The instrumentation scheduler 406 can run at each measurement interval, e.g., every minute, to determine which instrumentation members 506 are defined to have data gathered. The scheduler 406 can schedule measurements for each of instrumentation members 506 of particular interval list. The interval map routine can be referenced for this task. The instrumentation scheduler 406 can also be configured to each of the measurements of an interval list having a collection interval 204 that is a highest integer multiple of a current one of measurement intervals.

To illustrate, consider first a relatively simple measurement arrangement where the instrumentation scheduler 406 is configured to run at periodic measurement intervals of 1 minute, the interval map routine has configured 2 minute, 5 minute, 10 minute, and 15 minute interval lists, and the current measurement interval is 30 minutes (e.g., suppose the time of day is 9:30 am). According to the exemplary embodiment, even through the instrumentation members 506 of each of the 2, 5, 10, and 15 minute-interval lists have measurements defined to occur at 30 minutes (2, 5, 10, and 15 are all integral multiples of 30), only the instrumentation members 506 included in the 15 minute interval list are scheduled for measurement at the 30 minute measurement interval. Nevertheless, all measurements defined in the instrumentation members 506 of the 2, 5, and 10 minute interval lists will occur at the 30 minute measurement interval if the interval list merging is performed (e.g., by the interval map routine) as discussed above.

To further illustrate the operation of the measurement model, a more complex measurement arrangement will be described in which three requesters, Requesters A, B, and C, request different items of data, d1, d2, d3, and, d4, from three devices, X, Y, and Z, operating in a network. In the arrangement, the measurement interval at which the scheduler 406 is configured to "awake" is 30 seconds. Consider in the arrangement that the following events occur at the different requesters at the specified times:

| | |
|---|---|
| At 9:02:11 | Requester A requests d1, d2, d3, to be collected from devices X and Y every 5 minutes. |
| At 9:03:08 | Requester B requests d2, d3 to be collected from devices Y and Z every one minute. |
| At 9:04:17 | Requester C requests d2, d4 to be collected from devices X, Y, and Z every 30 seconds. |
| At 9:08:21 | Requester C shuts down his collection request |

The measurement model can consolidate the various requests corresponding to these events as shown in Table 1.

TABLE 1

Summary of Consolidated Measurement Requests

| TIME | REQUESTS TO DEVICE X | REQUESTS TO DEVICE Y | REQUESTS TO DEVICE Z |
|---|---|---|---|
| 9:04:00 | No Requests | d2, d3 <B> | d2, d3 <B> |
| 9:04:30 | d2, d4 <C> | d2, d4 <C> | d2, d4 <C> |
| 9:05:00 | d1, d2, d3, d4 <A & C> | d1, d2, d3, d4 <A, B & C> | d2, d3, d4 <B & C> |
| 9:05:30 | d2, d4 <C> | d2, d4 <C> | d2, d4 <C> |
| 9:06:00 | d2, d4 <C> | d2, d3, d4 <B & C> | d2, d3, d4 <B & C> |
| 9:06:30 | d2, d4 <C> | d2, d4 <C> | d2, d4 <C> |
| 9:07:00 | d2, d4 <C> | d2, d3, d4 <B & C> | d2, d3, d4 <B & C> |
| 9:07:30 | d2, d4 <C> | d2, d4 <C> | d2, d4 <C> |
| 9:08:00 | d2, d4 <C> | d2, d3, d4 <B & C> | d2, d3, d4 <B & C> |
| 9:08:30 | No Requests | No Requests | No Requests |
| 9:09:00 | No Requests | d2, d3 <B> | d2, d3 <B> |
| 9:09:30 | No Requests | No Requests | No Requests |
| 9:10:00 | d1, d2, d3 <A> | d1, d2, d3 <A & B> | d2, d3 <B> |

The table summarizes consolidated measurement requests in the measurement interval from time 9:04:00 to time 9:10:00. The bracketed letters (e.g., <A>) in the cells of the table identify the requester(s) of the data being collected. Note at time 9:05:00 that requests for d2 from device Y by requesters A, B, and C have been consolidated into a single request. At this same time, requests for d3 from device Y by requesters A and B have also been consolidated into a single request. Accordingly, the number of requests for data from device Y at time 9:05:00 is reduced from seven to four, a forty-three percent reduction. Consolidation also occurs at other cells in the table in which multiple requesters are identified.

The instrumentation layer can also include a request queue configured to launch a measurement request for each measurement scheduled by the instrumentation scheduler 406. The request quest can be the simple network management protocol (SNMP) request queue 404, shown in FIG. 4, or can generate requests according to other message protocols, e.g., ICMP. The instrumentation layer 400 can also include a response queue 802 (see FIG. 8), configured to receive data from the network corresponding to each launched measurement request. Again, the response queue 802 can be configured to receive response to SNMP requests sent to the network.

According to an exemplary embodiment, the instrumentation layer can also include an instrumentation manager 408 configured to transfer data received at the response queue directly to at least one measurable member 304 using a corresponding reference included in the instrumentation member 506 associated with collecting the data. With this arrangement, data need not actually be stored at the instrumentation layer 400. Instead, the instrumentation layer 400 can be configured to maintain references to the interested collection layer 100 entities, which can improve data collection performance. The arrangement can also allow changes to be made to the measurement model by rebuilding the instrumentation layer 400 without the loss of any measurement state information at the collection layer 100. The instrumentation manager 408 can also be configured to build one instrumentation object 402 per respective device (or node) included in a collection definition.

The measurable members 304 can be configured to store at least one of a present and previous value of measured data and the respective measurement times of the present and previous values, as illustrated by the measurable members 602, 604 shown in FIG. 6. These measurable members 602, 604 can support a method (e.g., getValue) that can be configured to return a value of that member. If a member 602, 604 corresponds to a text string or a gauge (or value), then the result can be the current (or previous) value returned from the member using the getValue method. If the member 602, 604 represents a counter, then the result can be an intervalized value, e.g., the current value minus the previous value. If the member 602, 604 corresponds to a ratio, then the result can be a per-second rate, e.g., the difference of the current and previous value divided by the difference of respective values of the measurement times.

Figure 9:
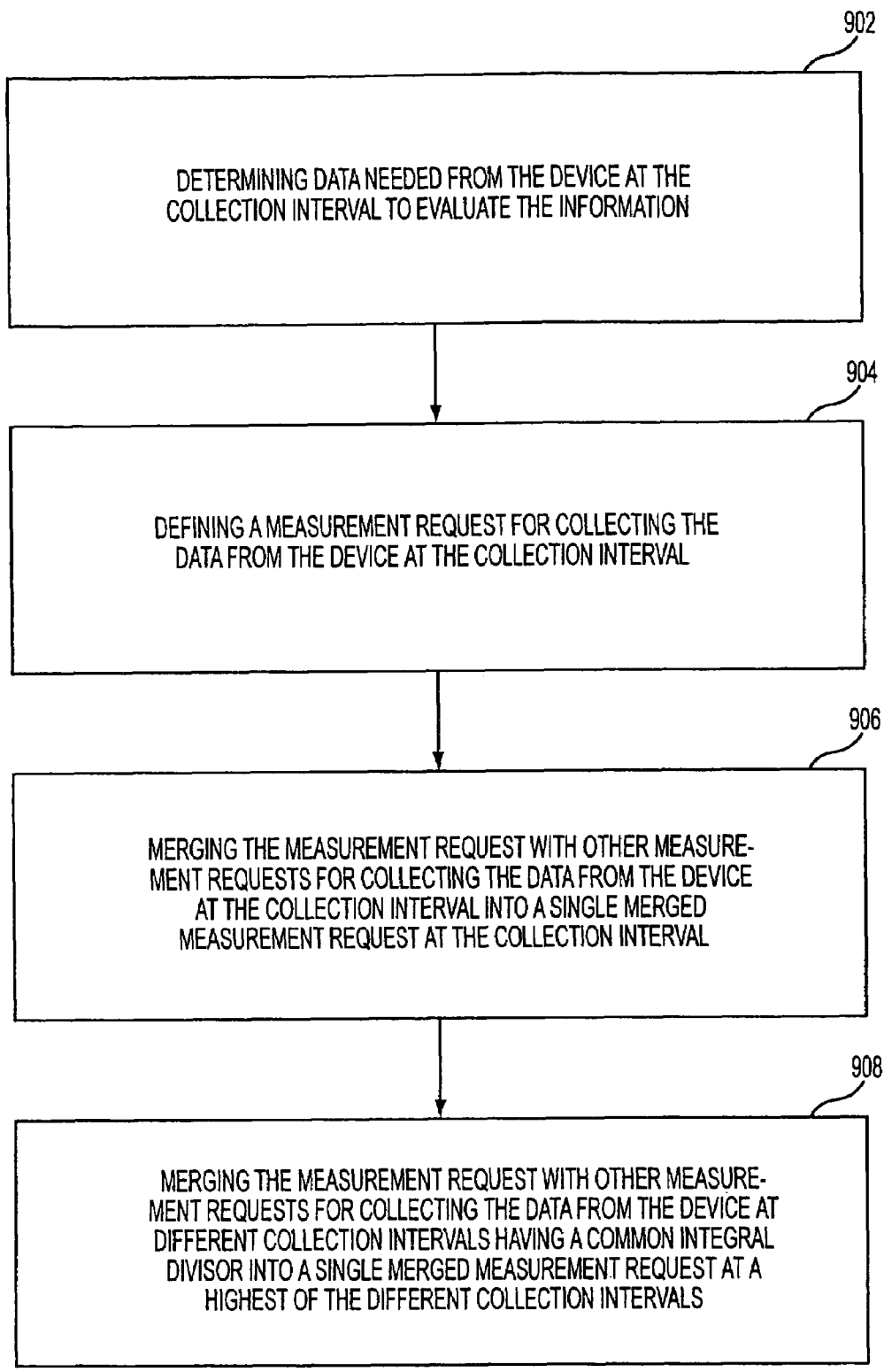
FIG. 9 is a flowchart illustrating a method for collecting information from a device in a network at a collection interval according to an exemplary embodiment.

FIG. 9 shows a flowchart illustrating a method for collecting information from a device in a network at a collection interval according to an exemplary embodiment. The method can be carried out using the measurement described above, and as such, the manner for carrying out the method using the above-described measurement model will not be described again here in detail.

The method beings in block 902, where data needed from the device at the collection interval to evaluate the information to be collected is determined. As discussed above, the information to be collected the device can be the result of a complex expression requiring several pieces of data to determine a value of the expression. Each piece of information needed to evaluate the information can be stored in a measurable member of a collection object of the measurement model. In block 904, a measurement request is defined for collecting the data from the device at the collection interval. The measurement request can correspond to the measurement defined in an instrumentation member of an instrumentation object that corresponds to the collection object.

In block 906, the defined measurement request can be merged with other measurement requests for collecting the data from the device at the collection interval into a single merged measurement request at the collection interval. In block 908 of the method, the defined measurement request can also be merged with other measurement requests for collecting the data from the device at different collection intervals having a common integral divisor into a single merged measurement request at a highest of the different collection intervals. A manner in which measurement requests for the same data from the same device is described above in conjunction with the forming of interval lists using the interval map routine of the measurement model's instrumentation layer.

According to an exemplary embodiment, a reference list, including destinations interested in the data to be collected from the device at the collection interval, can be associated with the measurement request. For example, the instrumentation member 606 shown in FIG. 6 includes a list of references 608 to measurable members 602, 604 that interested in the data to be collected from a measurement associated with the instrumentation member 606. As a result, the method can include distributing the measured data to each of the destinations in the reference list when the data is collected from the device at the collection interval. As discussed above, this consolidation of measurement requests can help to avoid over-burdening an network device with requests for the same information.

To merge measurement requests for a same piece of data from a same device at a same collection interval into a single measurement, destinations associated with other measurement requests can be added to the reference list associated with the merged single measurement request. In a related embodiment, measurement requests, including the merged measurement requests, can be grouped into a set of interval lists based on the collection intervals of the measurements requests. Again, this grouping is described in conjunction with the interval map routine discussed above.

In another related exemplary embodiment, the collecting of information from the network can be scheduled at periodic measurement intervals. The measurement requests of an interval list having a collection interval that is a highest integer multiple of a current measurement interval. For example, the scheduler 406 described above can be capable of scheduling the measurement requests included in a particular interval list depending on the current measurement interval. If the measurement requests in an interval lists having a collection interval that is an integral divisor of the interval list whose measurements are currently being scheduled have been merged into the current interval list, all measurements defined for the current measurement interval will be launched as well. Once launched, the data can be received from the network corresponding to each launched measurement request.

After the data is launched, a notification can be received, e.g., in a collection or management station of the network, indicating that the data needed from the device at the collection interval to evaluate the information has been collected. For example, when the data needed to evaluate certain information has been collected has been collected by an instrumentation member and transferred by the instrumentation layer to the corresponding measurable members, a notification can be sent from the instrumentation layer (e.g., from the instrumentation manager) to the collection layer (e.g., to the collection manager). When the notification is received, the information identified in the collection member can be evaluated, e.g., at the collection station or management station, using the data collected from the device at the collection interval.

According to an exemplary embodiment, at least one of a present and previous value of the collected data and the respective measurement times of the present and previous values can be stored for determining the information to be collected from the device. For example, the measurable members 602, 604 can be configured, as shown in FIG. 6, to store each the current and previous values of a collection, and the respective times at which those values are collected, and to return those values to a requester, e.g., using a method such as the getValue method described above.

ILLUSTRATIVE EXAMPLE

Figure 7:
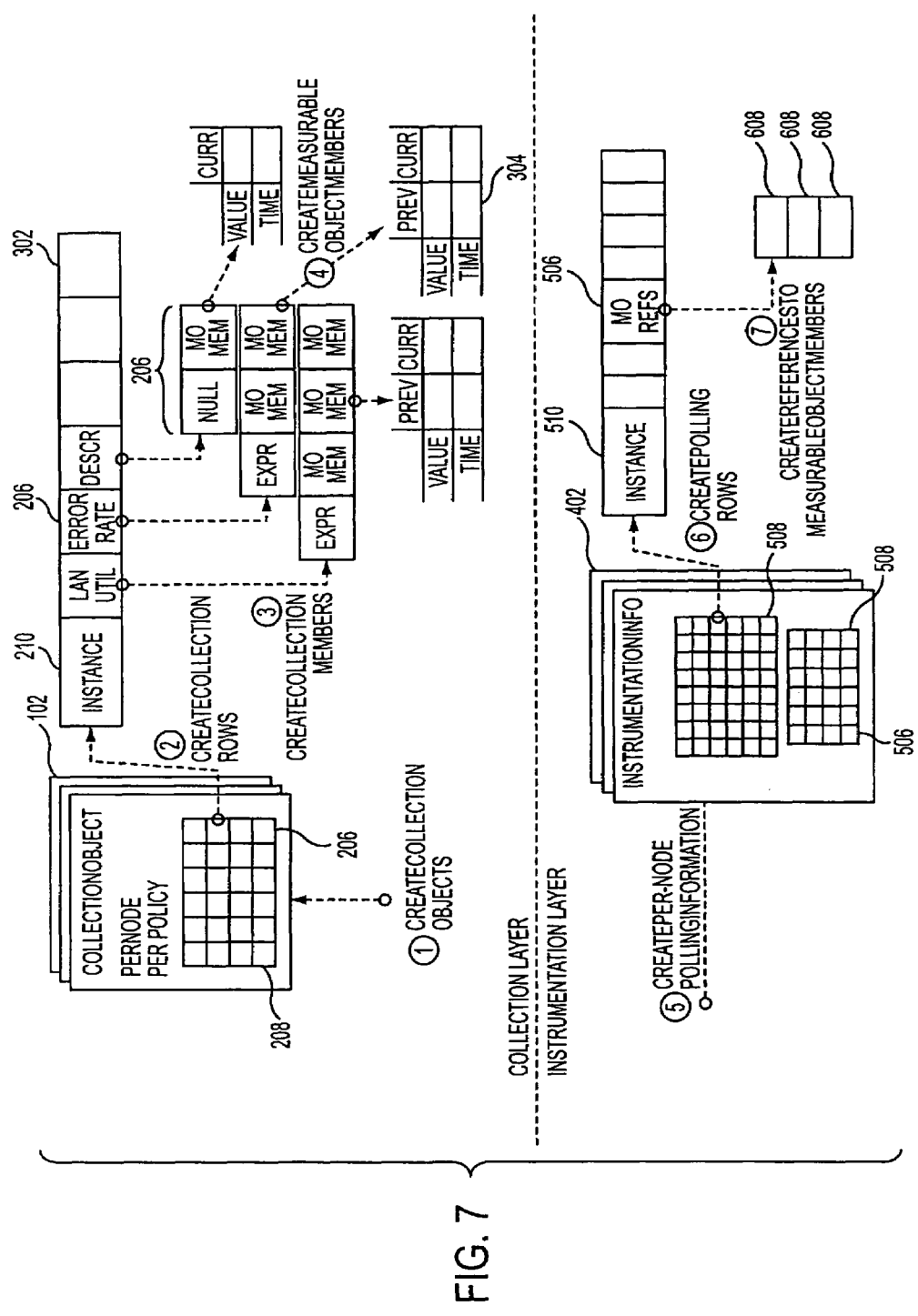
FIG. 7 provides an example of building the collection and instrumentation layers of the measurement model.
Figure 8:
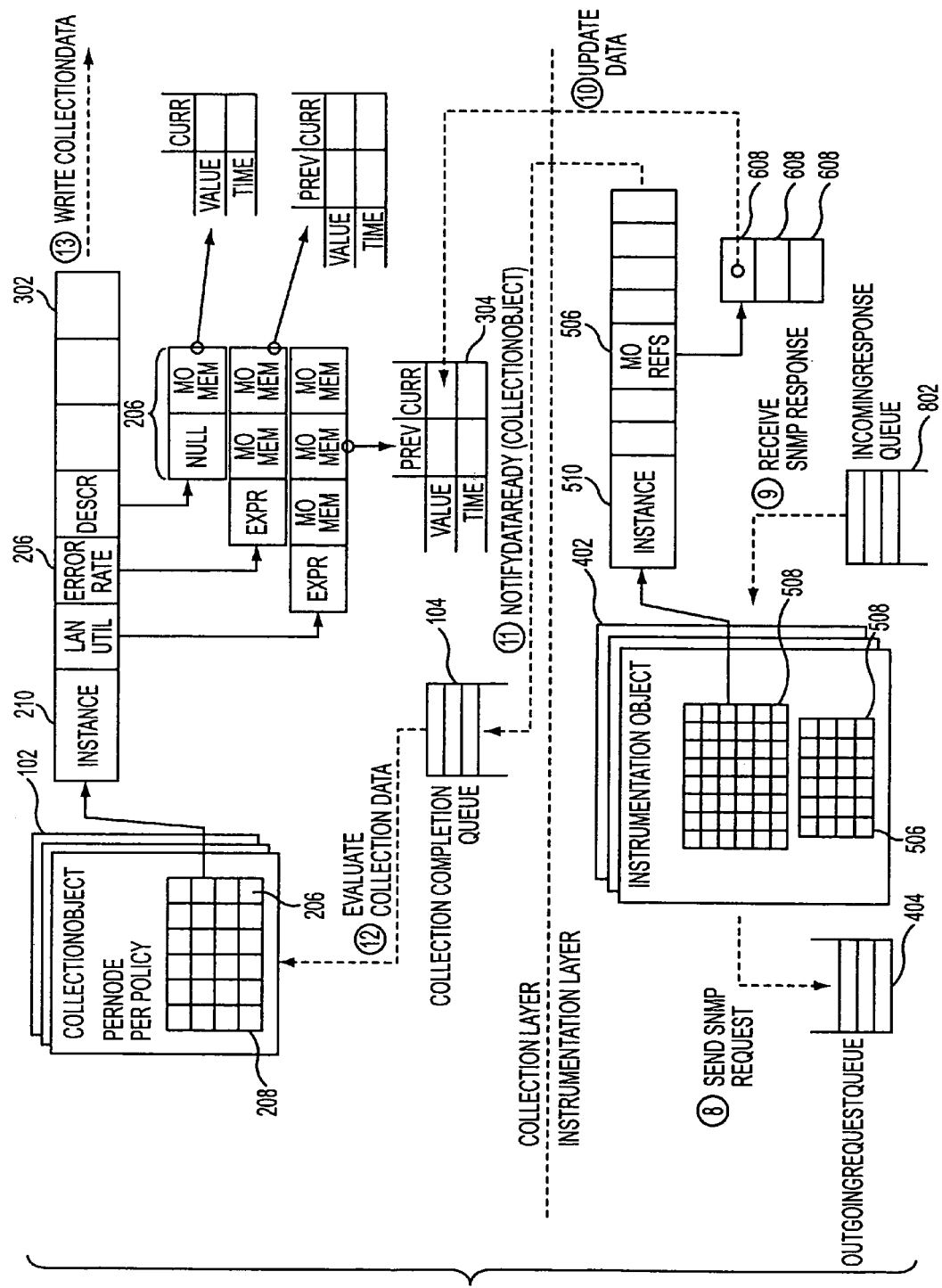
FIG. 8 provides an example of using the measurement model of FIG. 7 to collect information a network device.

An example for performing the method illustrated in FIG. 9 will now described in conjunction with FIGS. 7 and 8. The example uses a measurement model similar to that described in conjunction with FIGS. 1-6 above. The steps described below are labeled in the example circled numerals, but are merely illustrative in that they need not necessarily correspond to actions included in the method of FIG. 9, and need not occur in the order described.

In step 1, collection objects for defining the various data collections to occur in managed network environment are created. Each collection object can include the collections defined at a particular collection interval for a particular node (or device) in the network. Each of the defined collections can correspond to a collection member 206. The information in each collection object 102 can be organized into a collection table 208. Each cell the collection table 208 can correspond to a collection member 206. In step 2 of the example, the collection manager 108 can organize the various collection members 206 associated with collecting information from a particular instance 210 or interface of the device into a collection row 302 of the table 208.

In step 3, the collection members 206 corresponding to data need from the device to evaluate the information to be collected can be formed. The collection members 206 can include a definition of the information being collected, such as LAN utilization, error rate, or a simple text descriptor. The collection members 206 also include references to one or measurable members 304 configured to store the data need to evaluate the information. Evaluating complex expressions, such as LAN utilization, can require more than piece of data, and consequently will reference more than one measurable member 304, whereas simple gauges or counters can require the data stored in only one measurable member 304. In step 4, the measurable members 304 needed to store the data to evaluate each collection member 206 are formed. The measurable members 304 can be objects, having memory to store the current and previous values of the measured data, respective measurement times, and associated methods, such as the above-described getValue method, to retrieve the data from the member 304.

In step 5, the instrumentation manager 408 creates instrumentation objects 402 corresponding to each of the collection objects 102 formed by the collection manager 108, and consequently to the node (or device) associated with the corresponding collection object 102. Each instrumentation object can have its information organized into one or more instrumentation tables 508. Each table can correspond to the collections to occur at a particular collection interval 204, but can be organized in any convenient manner.

In step 6, the information of the instrumentation tables 508 is further organized into rows. Like the collection tables 208, the rows of the instrumentation tables 508 can be indexed by the instance 510 (or interface) from which the data needed to evaluate the information is to be gathered. Each cell in the instrumentation tables 508 represents an instrumentation member 506, and the cells in a particular row represent the measurements that are to occur at the particular instance that indexes the row. In step 7, the references 608 to the measurable members 304, 602, 604 that are configured to store the measured data corresponding to the instrumentation member 506 are added to the member.

Each of the above described steps can be performed at the physical collection layer 100 of the measurement model. The steps that will now be described can occur at the logical instrumentation layer 400. In step 8, measurement requests can be launched from the SNMP request queue 404. The measurements requests can be scheduled by the instrumentation scheduler 406. The measurement requests can be from an interval list, including merged measurement requests, constructed by the interval map routine described above. In step 9, data corresponding to the launched SNMP requests can be received at the response queue 802.

In step 10, the data received from the target device in the network can be directly transferred to the measurable members 304 interested in the data as specified by the references 608 included in the instrumentation member corresponding to the received data. In step 11, a message indicating that the needed data has been received can be sent from the instrumentation layer 400 to the notification queue 104 of the collection layer 100. At step 12, the information defined in the collection member 206, e.g., LAN utilization, is evaluated using the data collected from the target device by the instrumentation member 506 and stored in the corresponding measurable members 304. Once evaluated, the collected information can be written to a destination in the network at step 13.

The executable instructions of a computer program as illustrated in FIG. 9 for collecting information from a device in a network at a collection interval can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A measurement model for collecting information from a device in a network at a collection interval, the measurement model comprising:
   a collection layer including a collection object corresponding to the device and to the collection interval, the collection object having
      a collection member configured to identify the information to be collected from the device at the collection interval, and
      a measurable member associated with the collection member, the measurable member configured to store data needed from the device at the collection interval to evaluate the information; and
   an instrumentation layer including an instrumentation object corresponding to the device, the instrumentation object having
      an instrumentation member associated with collecting the data needed from the device at the collection interval to evaluate the information, the instrumentation member including a reference to the measurable member configured to store the collected data.

2. The measurement model of claim 1, wherein the collection object comprises a collection table and the collection member is a cell in the collection table, the collection table including:
   at least one row corresponding to a respective interface of the device associated with the information to be collected from the device at the collection interval; and
   at least one column corresponding to a respective definition of the information to be collected from the device at the collection interval.

3. The measurement model of claim 1, wherein the collection layer comprises:
   a notification queue configured to receive a message from the instrumentation layer indicating that the data needed from the device at the collection interval to evaluate the information identified in the collection member is stored in the associated measurable member; and
   a notification handler configured to evaluate the information identified in the collection member using the data stored in the associated measurable member.

4. The measurement model of claim 1, wherein the collection layer comprises:
   a collection manager configured to build one collection object per respective device and associated collection interval included in a collection definition.

5. The measurement model of claim 1, wherein the instrumentation object comprises an instrumentation table and the instrumentation member is a cell in the instrumentation table, the instrumentation table including:
   at least one row corresponding to a respective interface of the device associated with the data needed from the device at the collection interval to evaluate the information; and
   at least one column corresponding to a respective definition of the data needed from the device at the collection interval to evaluate the information.

6. The measurement model of claim 1, wherein the instrumentation layer comprises:
   an interval map routine configured to group instrumentation members of at least one instrumentation object into a set of interval lists based on the collection intervals associated with the instrumentation members.

7. The measurement model of claim 6, wherein for each interval list, the interval map routine is configured to:
   merge the instrumentation members of the respective interval list associated with collecting a same data from a same device into a single merged instrumentation member of the respective interval list; and
   merge the instrumentation members of the respective interval list with the instrumentation members of the other interval lists associated with collecting a same data from a same device as the instrumentation members of the respective interval list to form another single merged instrumentation member of the respective interval list when the collection intervals of the instrumentation members of the other interval lists are an integral divisor of the collection interval of the instrumentation members of the respective interval list.

8. The measurement model of claim 7, wherein for each instrumentation member being merged into the respective interval list, the interval map routine is configured to:
add references to measurable members included in the respective instrumentation member being merged into the corresponding merged instrumentation member.

9. The measurement model of claim 1, wherein the instrumentation layer comprises:
an instrumentation scheduler configured to schedule the collecting of information from the network at periodic measurement intervals and to schedule each of the measurements of an interval list having a collection interval that is a highest integer multiple of a current one of measurement intervals.

10. The measurement model of claim 9, wherein the instrumentation layer comprises
a request queue configured to launch a measurement request for each scheduled measurement; and
a response queue configured to receive data from the network corresponding to each launched measurement request.

11. The measurement model of claim 10, wherein the instrumentation layer comprises:
an instrumentation manager configured to transfer data received at the response queue directly to at least one measurable member using a corresponding reference included in the instrumentation member associated with collecting the data.

12. The measurement model of claim 1, wherein the instrumentation layer comprises:
an instrumentation manager configured to build one instrumentation object per respective device included in a collection definition.

13. The measurement of model of claim 1, wherein the measurable member is configured to store at least one of a present and previous value of measured data and the respective measurement times of the present and previous values.

14. The measurement model of claim 1, wherein the information identified in the collection member comprises at least one of:
a gauge that includes one of a present value and a previous value of data stored in the measurable member;
a counter that includes the present value of the data minus a previous value of the data stored in the measurable member;
a ratio that includes a difference of the present and previous values of the data divided by a difference of the respective measurement times of the present and previous values of the data stored in the measurable member;
a textual expression stored in the measurable member; and
an expression including data stored in at least measurable member associated with the collection member.

* * * * *